(12) United States Patent
Persson et al.

(10) Patent No.: US 12,249,130 B2
(45) Date of Patent: Mar. 11, 2025

(54) HEADLIGHT CONTROL SYSTEM FOR A MOTOR VEHICLE AND A METHOD OF TRAINING A MACHINE LEARNING MODEL FOR A HEADLIGHT CONTROL SYSTEM

(71) Applicant: Arriver Software AB, Linköping (SE)

(72) Inventors: Gustav Persson, Ljungsbro (SE); Per Cronvall, Linköping (SE)

(73) Assignee: Qualcomm Auto Ltd., Cambridge (GB)

( * ) Notice: Subject to any disclaimer, the term of this patent is extended or adjusted under 35 U.S.C. 154(b) by 249 days.

(21) Appl. No.: 17/435,765

(22) PCT Filed: Mar. 5, 2020

(86) PCT No.: PCT/EP2020/055877
§ 371 (c)(1),
(2) Date: Sep. 2, 2021

(87) PCT Pub. No.: WO2020/182619
PCT Pub. Date: Sep. 17, 2020

(65) Prior Publication Data
US 2022/0161713 A1     May 26, 2022

(30) Foreign Application Priority Data
Mar. 12, 2019    (EP) .................................... 19162105

(51) Int. Cl.
*G06V 10/82*        (2022.01)
*B60Q 1/00*         (2006.01)
(Continued)

(52) U.S. Cl.
CPC ............. *G06V 10/82* (2022.01); *B60Q 1/143* (2013.01); *G06V 10/141* (2022.01); *G06V 20/56* (2022.01);
(Continued)

(58) Field of Classification Search
CPC ............ B60Q 2300/42; B60Q 2300/41; B60Q 1/143; B60Q 1/085; B60Q 1/1423; B60Q 2300/45; B60Q 2300/054
See application file for complete search history.

(56) References Cited

U.S. PATENT DOCUMENTS

| 6,587,573 B1 | 7/2003 | Stam et al. |
| 6,928,180 B2 | 8/2005 | Stam et al. |

(Continued)

FOREIGN PATENT DOCUMENTS

| CN | 106114345 A | 11/2016 |
| CN | 108312957 A | 7/2018 |

(Continued)

OTHER PUBLICATIONS

International Search Report and Written Opinion of PCT/EP2020/055877, mailed May 14, 2020.
(Continued)

*Primary Examiner* — Wei (Victor) Y Chan
(74) *Attorney, Agent, or Firm* — Qualcomm Auto Ltd.

(57) ABSTRACT

A headlight control system (10) for a motor vehicle including, a controllable headlight (24) adapted to generate variable illumination of the vehicle environment, an imaging apparatus (11) adapted to capture images (100) from a region in front of the motor vehicle, and a data processing device (14) adapted to perform image processing of images (100) captured by the imaging apparatus (11) and to vary the light characteristics of the controllable headlight (24) depending on the image processing. A machine learning model (27) is implemented in the data processing device (14) which is trained to estimate and output an output signal (29) representing a desired illumination of the vehicle environment from one or more images (28) received as input from the imaging apparatus (11).

22 Claims, 2 Drawing Sheets

(51) Int. Cl.
*B60Q 1/14* (2006.01)
*G06V 10/141* (2022.01)
*G06V 20/56* (2022.01)
*G06V 20/58* (2022.01)

(52) U.S. Cl.
CPC ............ *G06V 20/58* (2022.01); *B60Q 1/0023* (2013.01); *B60Q 2300/42* (2013.01)

(56) References Cited

U.S. PATENT DOCUMENTS

| | | | |
|---|---|---|---|
| 6,947,576 | B2 | 9/2005 | Stam et al. |
| 7,825,600 | B2 | 11/2010 | Stam et al. |
| 2003/0123705 | A1* | 7/2003 | Stam ...................... G06V 20/56 382/104 |
| 2008/0225271 | A1* | 9/2008 | Ohmura ................. B60Q 1/085 356/51 |
| 2009/0279317 | A1* | 11/2009 | Tatara .................... B60Q 1/143 362/465 |
| 2014/0029803 | A1 | 1/2014 | Hammarström et al. |
| 2015/0028741 | A1* | 1/2015 | Schmidt ............... B60Q 1/1423 315/82 |
| 2019/0007595 | A1* | 1/2019 | Sanchez ................. H04N 7/183 |
| 2019/0094136 | A1* | 3/2019 | Juette ...................... B60Q 1/08 |
| 2019/0354786 | A1* | 11/2019 | Lee ........................ G06N 3/084 |
| 2021/0289604 | A1* | 9/2021 | Ando .................... B60Q 1/085 |

FOREIGN PATENT DOCUMENTS

| | | |
|---|---|---|
| EP | 2 420 408 A1 | 2/2012 |
| EP | 2 495 127 B1 | 7/2014 |
| WO | 2017109136 A1 | 6/2017 |
| WO | 2018/087941 A1 | 5/2018 |

OTHER PUBLICATIONS

European Search Report—EP19162105—Search Authority—The Hague—Oct. 9, 2019.

* cited by examiner

HEADLIGHT CONTROL SYSTEM FOR A MOTOR VEHICLE AND A METHOD OF TRAINING A MACHINE LEARNING MODEL FOR A HEADLIGHT CONTROL SYSTEM

CROSS-REFERENCE TO RELATED APPLICATIONS

This application is a 35 U.S.C. § 371 national phase of PCT International Application No. PCT/EP2020/055877, filed Mar. 5, 2020, which claims the benefit of priority under 35 U.S.C. § 119 to European Patent Application No. 19162105.1, filed Mar. 12, 2019, the contents of which are incorporated herein by reference in their entirety.

FIELD OF THE INVENTION

The invention relates to a headlight control system for a motor vehicle, including a controllable headlight adapted to generate variable illumination of the vehicle environment, an imaging apparatus adapted to capture images from a region in front of the motor vehicle, and a data processing device adapted to perform image processing of images captured by the imaging apparatus and to vary the light characteristics of the controllable headlight depending on the image processing. The invention also relates to a method of training a machine learning model for such a headlight control system.

BACKGROUND

Systems for automatic headlight control typically base their decisions on explicit detection of individual vehicles or light sources. This makes it difficult to handle situations properly where vehicles appear in curves or over crests, or when headlights of oncoming vehicles are occluded by guard rails, barriers or other objects.

EP 2 495 127 B1 discloses a light aura detection approach to assist detection of vehicles appearing in curves or over crests. This approach, however, puts rather strict requirements on the appearance of such an aura and does not address the issue of other structures or objects occluding the light sources. Additionally, this approach must be complemented by a light source detector or vehicle detector. Furthermore, to control the headlights additional logic is needed for interpreting the detections and to decide how the road ahead should be illuminated.

SUMMARY AND INTRODUCTORY DESCRIPTION OF EMBODIMENTS OF THE INVENTION

The problem underlying the present invention is to provide a holistic approach for a headlight control system adapted to handle different light conditions including all kinds of situations where structures and objects occlude light sources.

Embodiments of the invention solves the above-referenced problem with the features described herein. According to the invention, a machine learning model is implemented in the data processing device which is trained to estimate and output an output signal representing a desired illumination of the vehicle environment from one or more images received as input from the imaging apparatus.

A human is able to interpret a multitude of light cues, such as halos, stray light or reflections, and thereby, for example, determine likely locations of other vehicles. To mimic this approach, the invention provides a machine learning model which has been trained to holistically consider an entire image, or a plurality of images, to directly estimate a headlight control signal, or more generally an output signal representing a desired illumination of the vehicle environment. Generally, a desired illumination of the vehicle environment by one or more headlights includes the angular distribution and/or intensity distribution of all light sources present in the headlight of a motor vehicle, including an illumination state of a high beam light source.

In a preferred embodiment of the invention, the machine learning model is a convolutional neural network. The machine learning model is advantageously trained to output a desired illumination profile, which is preferably defined as any one of an upper vertical illumination angle per horizontal angular section, or a curve delimiting a desired area of illumination in an image, given an input image or several input images. In this case, the output signal output by the machine learning model advantageously includes a desired illumination profile as defined above, expressed in angles relative to the optical axis of a headlight.

Ground truth data is preferably generated by manual annotation, i.e., by a human annotator. For distances significantly longer than the separation between imaging device (camera) and headlight, the desired illumination profile is closely approximated by a curve delimiting the desired area of illumination in the image, which can easily be identified by a human annotator. Therefore, the machine learning model can advantageously be trained to output a curve delimiting a desired area of illumination in an image, rather than, for example, a desired illumination profile.

Alternative output representations of the desired illumination, to be output by the machine learning model, may be utilized. For example, the machine learning model may be trained to output a desired distance profile, which is preferably defined as the illumination distance per horizontal angular section. In this case, the output signal output by the machine learning model advantageously includes a desired distance profile as defined above.

In another embodiment, the machine learning model may be trained to output a desired per-pixel intensity map of the headlight. In other words, the output signal output by the machine learning model advantageously includes a desired per-pixel intensity map. This output representation can be particularly useful in combination with matrix headlights, wherein each headlight includes a matrix of light sources, like LEDs, the intensity of which can be controlled individually.

To make use of temporal information in the input, the machine learning model could take several sequential images as input, and/or exhibit internal feedback, e.g. as in a recurrent neural network.

Preferably, the output signal is transmitted to a headlight controller generating a headlight adjustment signal, wherein preferably the headlight adjustment signal is fed back to the machine learning model. In other words, for improved performance, the machine learning model may be provided with the current status of the headlights, which may be called an external feedback.

In a preferred embodiment, one might want to lower the intensity or illumination angle of the headlights actively, to enable detection of, for example, a halo from an oncoming vehicle that is occluded from view to the host vehicle by the terrain. The machine learning model could therefore be trained to identify situations where it is desirable to actively lower the intensity or illumination angle of the headlights, and to output an appropriate control or output signal for achieving this. The period of time for which the light intensity is lowered is preferably shorter than can be perceived by the driver.

If desirable, for example for reasons related to robustness or memory footprint, the machine learning model could preferably be adapted to process individually different parts of an input image in order to provide local contributions to the desired illumination, for example to the desired illumination profile, in the output signal from different parts of the field of view of the imaging apparatus.

The invention also refers to a method of training a machine learning model for a headlight control system as described above. The machine learning model is trained in a supervised manner using a ground truth training data set specifying the desired output for each input sample, namely one image or a plurality of images, in the training data set.

Preferably, the ground truth training data set includes one or more images, which are preferably captured by an existing imaging apparatus.

In an embodiment of the invention, ground truth data is generated by manual annotation of the one or more images. Preferably, the ground truth training data set includes annotations in the form of a curve delimiting the desired area of illumination.

Ground truth training data may be generated in several alternative or complementary ways. For example, the ground truth training data set may be generated using object detections from an existing object detection system, and/or an object tracker to track detected objects over consecutive images. Since the object detections are used offline in this case, the objects may preferably be tracked in a non-causal manner to a point outside or beyond the initial detection range.

Alternatively, the ground truth training data set may be generated using semi-automatic annotations using output from an existing headlight control system or object detection system.

In still another alternative embodiment, the ground truth training data set is generated using a recording of manual high beam control signals.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
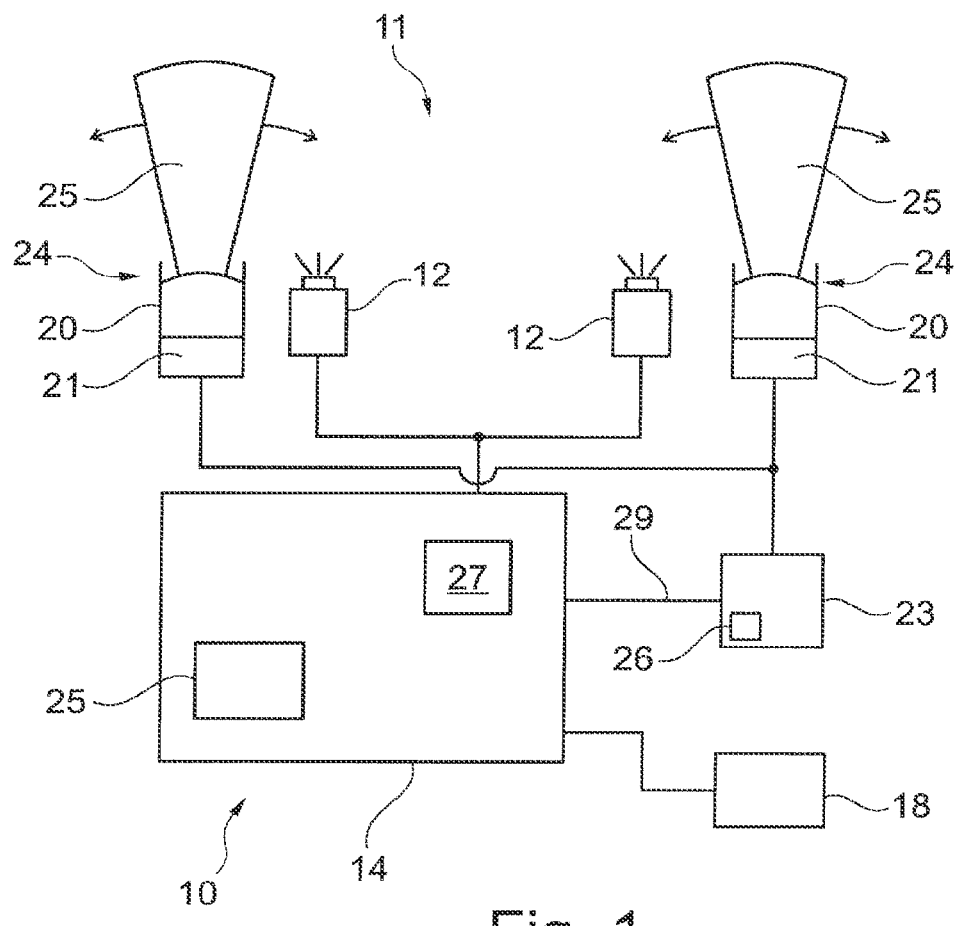
FIG. 1 shows a schematic arrangement of a headlight control system.

The headlight control system 10 is to be mounted in or to a motor vehicle and includes an imaging apparatus 11 for capturing images of a region surrounding the motor vehicle, for example a region in front of the motor vehicle. The imaging apparatus 11 may be mounted for example behind the vehicle windscreen or windshield, in a vehicle headlight, or in the radiator grille. Preferably the imaging apparatus 11 includes one or more optical imaging devices 12, in particular cameras, preferably operating in the visible wavelength range, in the infrared wavelength range, or in both visible and infrared wavelength range, where infrared covers near IR with wavelengths below 5 microns and/or far IR with wavelengths beyond 5 microns. In some embodiments the imaging apparatus 11 includes a plurality of imaging devices 12 in particular forming a stereo imaging apparatus 11. In other embodiments only one imaging device 12 forming a mono imaging apparatus 11 can be used.

The imaging apparatus 11 is coupled to an on-board data processing device 14 adapted to process the image data received from the imaging apparatus 11. The data processing device 14 is preferably a digital device which is programmed or programmable and preferably includes a microprocessor, a microcontroller, a digital signal processor (DSP), and/or a microprocessor part in a System-On-Chip (SoC) device, and preferably has access to, or includes, a digital data memory 25. The data processing device 14 may be provided as a dedicated hardware device, like a Field Programmable Gate Array (FPGA), an Application Specific Integrated Circuit (ASIC), a Graphics Processing Unit (GPU) or an FPGA and/or ASIC and/or GPU part in a System-On-Chip (SoC) device, for performing certain functions, for example controlling the capture of images by the imaging apparatus 11, receiving the electrical signal containing the image information from the imaging apparatus 11, rectifying or warping pairs of left/right images into alignment and/or creating disparity or depth images. The data processing device 14, or part of its functions, can be realized by a System-On-Chip (SoC) device including, for example, FPGA, DSP, ARM, GPU and/or microprocessor functionality. The data processing device 14 and the memory device 25 are preferably realised in an on-board electronic control unit (ECU) and may be connected to the imaging apparatus 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image processing to possible activation or control of a safety device 18 are performed automatically and continuously during driving in real time.

The invention is applicable to autonomous driving, where the ego vehicle is an autonomous vehicle adapted to drive partly or fully autonomously or automatically, and driving actions of the driver are partially and/or completely replaced or executed by the ego vehicle.

The headlight control system 10 includes one or more, for example two headlights 24 with at least one light source 20. Preferably, each headlight 24 is dynamically adjustable, i.e. the light profile of at least one light source 20 including the angular distribution and/or the intensity of the emitted light can be changed over time by an adjustment device 21 and controlled by a headlight controller 23. The headlight controller 23 can be part of the processing device 14 or a separate processing device and part of the same ECU with the processing device 14, or a different ECU. The imaging apparatus 11 is preferably directed in approximately the same direction as the headlights 24, such that the field of view of the imaging apparatus 11 and the illumination region of the headlights 24 at least partially overlap.

The adjustment device 21 may be adapted to adjust the corresponding light source 20 in such a manner that the light beam or light cone 25 emitted by the headlight 24 is moved in a lateral direction and/or in a vertical direction or any other direction, as indicated by the arrows at the side of the light cones 25. The adjustment device 21 can be adapted to turn the complete headlight 24, to block or shield different parts of the light beam 25, to move one or more optical elements within the headlight 24, to change optical properties of one or more optical elements within the headlight 24, or any other suitable mechanism. The adjustable headlight 24 may be an advanced lighting system, in particular based on LEDs, which can shape the light beam 25 around the oncoming vehicle without dazzling the oncoming driver.

The adjustment device 21 may be adapted to perform high beam control, i.e. to turn on and off the high beam included in the headlight 24 automatically as controlled by a high beam controller 26. The high beam controller 26 is preferably part of the headlight controller 23, but may also be a separate part.

Figure 2:
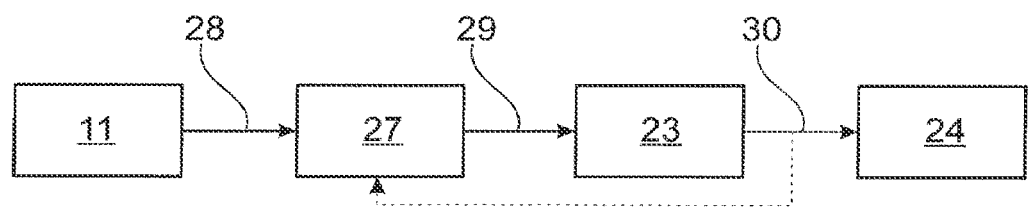
FIG. 2 shows a flow diagram illustrating headlight control according the invention.

As will be described in the following in more detail with respect to FIG. 2, the headlight controller 23 and/or the high beam controller 26, and thus the adjustment devices 21 for the headlights 24, are controlled during driving by the data processing device 14 on the basis of results obtained from data processing of the images received from the imaging apparatus 11. This is also called dynamic headlight control. Therefore, the data processing device 14 together with the headlight controller 23 and/or the high beam controller 26 forms a dynamic headlight control device or controller.

According to the invention, a machine learning model 27, for example a convolutional neural network, is implemented in the processing device 14. The machine learning model 27 has been trained in a training phase prior to implementing it in the processing device 14, to directly estimate and output a headlight control signal and/or the desired illumination profile 29, from one or more entire images 28 received from the imaging apparatus 11 and input into the machine learning model 27. The training process will be described in more detail later with respect to FIG. 4.

Figure 3:
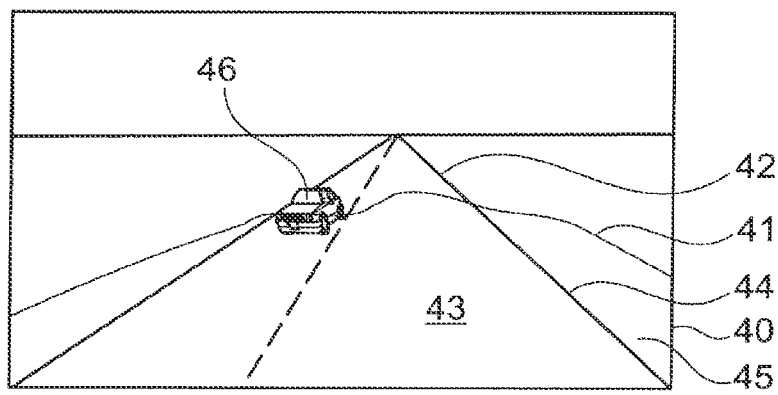
FIG. 3 shows an image with a curve delimiting a desired area of illumination.

During driving of the host vehicle, an image 28 or a plurality of images 28 captured by the imaging apparatus 11 are input to the machine learning model 27. The machine learning model 27 is capable of outputting an output signal 29 including a representation of a desired illumination of the vehicle environment by the headlights 24. The representation is for example a curve 41 delimiting a desired area of illumination in an image 40. As can be seen in FIG. 3, the curve 41 is determined in a manner that the road 42, in particular the ego lane 43 and a region 45 at the road edge 44 of the ego lane 43, where pedestrians, bicyclists and/or large animals may be expected, is well illuminated, however, without dazzling the driver of an oncoming vehicle 46. The curve 45 usually is an excellent approximation to the illumination profile, i.e. an upper vertical illumination angle per horizontal angular section. Usually, the region below the curve 41 can be well illuminated with high intensity, whereas the region above the curve 41 shall not be illuminated, or only with low intensity not dazzling the driver of an oncoming vehicle 46.

The output signal 29 is forwarded to a headlight controller 23 which in turn sends a headlight control signal 30 to the headlights 24, in particular the headlight adjusting section 21 thereof. The headlight control signal 30 adjusts the headlights 24 in a manner that the region below the curve 41 is well illuminated and the region above the curve 41 is not, or only sparsely, illuminated. This includes possible automatic dim-out or switching off of the high beam in the headlights 12.

Figure 4:
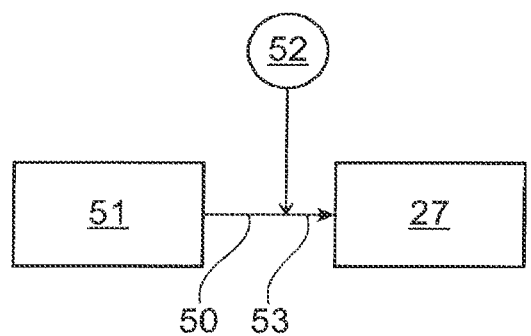
FIG. 4 shows a flow diagram illustrating training a machine learning model for a headlight control system.

The training of the machine learning model 27 is described in the following with respect to FIG. 4. A large set of training images 50 is generated, for example with an imaging apparatus 51, which may preferably be similar or even identical to the imaging apparatus 11 of the vehicle where the machine learning model 27 is implemented. The set of training images 50 preferably covers an extensive range of light conditions which may occur in motor vehicle traffic.

All training images 50 are annotated by a human annotator 52. The annotations preferably include an appropriate illumination profile for every training image 50 as estimated by the human annotator 52. For example, the human annotator 52 may draw a curve 41 in every training image 50 such that the region below the curve 41 should be well illuminated and the region above the curve 41 is not, or only sparsely, illuminated, according to the best estimation of the human annotator. The set of training images 50 together with the corresponding annotations, for example curves 41, forms an annotated or ground truth data set 53 of training images. The ground truth data set 53 of training images is input into the machine learning model 27 which can learn from this input to output an appropriate illumination profile for an arbitrary input image 28, or set of input images 28, when implemented in a motor vehicle.

While the above description constitutes the preferred embodiment of the present invention, it will be appreciated that the invention is susceptible to modification, variation and change without departing from the proper scope and fair meaning of the accompanying claims.

The invention claimed is:

1. A headlight control system for a motor vehicle, comprising;
a controllable headlight adapted to generate variable illumination of a vehicle environment in front of the motor vehicle, the controllable headlight comprising a plurality of optical elements;
an imaging apparatus adapted to capture images from a region in front of the motor vehicle;
a data processing device adapted to perform image processing of images captured by the imaging apparatus and to generate an output signal to control an illumination profile of the headlight based on the image processing, wherein the data processing device is adapted to generate the output signal to temporarily lower an intensity or illumination angle of the controllable headlight, for a period of time, based on a determination for the imaging apparatus to capture an image while the intensity or illumination angle of the controllable headlight is lowered, the data processing device being adapted to perform image processing of the image that is captured by the imaging apparatus during the period of time, and to return the intensity or illumination angle of the controllable headlight after the period of time, wherein the data processing device is further adapted to determine a curve delimiting an area of illumination based on the image processing of the images, the area of illumination comprising a first region below the curve and a second region above the curve; and
a headlight controller adapted to generate a headlight control signal based on the output signal, wherein the headlight controller is further adapted to transmit the headlight control signal to the controllable headlight to adjust the plurality of optical elements within the controllable headlight to illuminate the first region and the second region, wherein the second region is illuminated at a lower intensity than the first region.

2. The headlight control system as claimed in claim 1, wherein a machine learning model is implemented in the data processing device, and wherein the machine learning model is trained to determine the output signal based on the processing of at least one image of the images captured by the imaging apparatus.

3. The headlight control system as claimed in claim 1, wherein the illumination profile is defined as an upper vertical illumination angle per horizontal angular section relative to an optical axis of the controllable headlight.

4. The headlight control system as claimed in claim 2, wherein the output signal represents a distance profile, wherein the distance profile is defined as an illumination distance per angular section.

5. The headlight control system as claimed in claim 1, wherein the output signal represents a desired per-pixel intensity map.

6. The headlight control system as claimed in claim 4, wherein the headlight adjustment control signal is fed back to the machine learning model.

7. The headlight control system as claimed in claim 1, wherein the data processing device is adapted to process, individually, different parts of an input image in order to determine local contributions to the illumination profile.

8. A device comprising:
an imaging apparatus;
a memory; and
a processor coupled to the imaging apparatus and the memory, the processor configured to
  receive a first set of image data from the imaging apparatus;
  generate an output signal to control a first illumination profile of a vehicle headlight based on the first set of image data, wherein the output signal is also to temporarily lower an intensity or illumination angle of the vehicle headlight, for a period of time, based on a determination for the imaging apparatus to capture an image while the intensity or illumination angle of the controllable headlight is lowered, and to return the intensity or illumination angle of the controllable headlight after the period of time, the processor being configured to perform image processing of the image that is captured by the imaging apparatus during the period of time;
  determine a curve delimiting an area of illumination based on the image processing of the first set of image data, the area of illumination comprising a first region below the curve and a second region above the curve;
  generate a headlight control signal based on the output signal; and
  transmit the headlight control signal to a vehicle headlight to adjust a plurality of optical elements within the vehicle headlight to illuminate the first region and the second region, wherein the second region is illuminated at a lower intensity than the first region.

9. The device as claimed in claim 8, wherein the processor is configured to implement a machine learning model trained to determine the output signal based on the first set of image data.

10. The device as claimed in claim 8, wherein the processor is further configured to:
receive a second set of image data; and
generate an adjusted output signal to control a second illumination profile of the vehicle headlight based on the second set of image data, wherein a light intensity of the second illumination profile is less than a light intensity of the first illumination profile.

11. The device as claimed in claim 10, wherein the processor is configured to generate a second adjusted output signal to control a third illumination profile of the vehicle headlight, wherein the second adjusted output signal is generated following a predetermined period of time after the adjusted output signal is generated.

12. The device as claimed in claim 8, wherein the processor is configured to process, individually, different parts of an image of the first set of image data to determine local contributions to the illumination profile.

13. A method comprising:
receiving a first set of image data produced by an imaging apparatus;
generating an output signal to control a first illumination profile of a vehicle headlight based on the first set of image data, wherein the output signal is also to temporarily lower an intensity or illumination angle of the vehicle headlight, for a period of time, based on a determination for the imaging apparatus to capture an image while the intensity or illumination angle of the controllable headlight is lowered, and to return the intensity or illumination angle of the controllable headlight after the period of time;
performing image processing of the image that is captured by the imaging apparatus during the period of time;
determining a curve delimiting an area of illumination based on the image processing of the first set of images, the area of illumination comprising a first region below the curve and a second region above the curve;
generating a headlight control signal based on the output signal; and
transmitting the headlight control signal to a vehicle headlight to adjust a plurality of optical elements within the vehicle headlight to illuminate the first region and the second region, wherein the second region is illuminated at a lower intensity than the first region.

14. The method as claimed in claim 13, further comprising:
receiving a second set of image data; and
generating an adjusted output signal to control a second illumination profile of the vehicle headlight based on the second set of image data, wherein a light intensity of the second illumination profile is less than a light intensity of the first illumination profile.

15. The method as claimed in claim 14, further comprising generating a second adjusted output signal to control a third illumination profile of the vehicle headlight, wherein the second adjusted output signal is generated following a predetermined period of time after the adjusted output signal is generated.

16. The method as claimed in claim 13, wherein performing image processing of the image that is captured by the imaging apparatus during the period of time comprises analyzing the image to detect a halo from an occluded oncoming vehicle.

17. The headlight control system as claimed in claim 1, wherein to perform image processing of the image that is captured by the imaging apparatus during the period of time data processing device, the data processing device is adapted to analyze the image to detect a halo.

18. The device as claimed in claim 8, wherein to perform image processing of the image that is captured by the imaging apparatus during the period of time data processing device, the processor is adapted to analyze the image to detect a halo.

19. The headlight control system as claimed in claim 1, wherein the period of time is shorter than can be perceived by a human.

20. The headlight control system of claim 1, wherein the illumination profile comprises the curve.

21. The device of claim 8, wherein the illumination profile comprises the curve.

22. The method of claim 13, wherein the illumination profile comprises the curve.

* * * * *